May 1, 1934.    J. O. FINK    1,956,828
CLUTCH DISK
Filed March 2, 1931
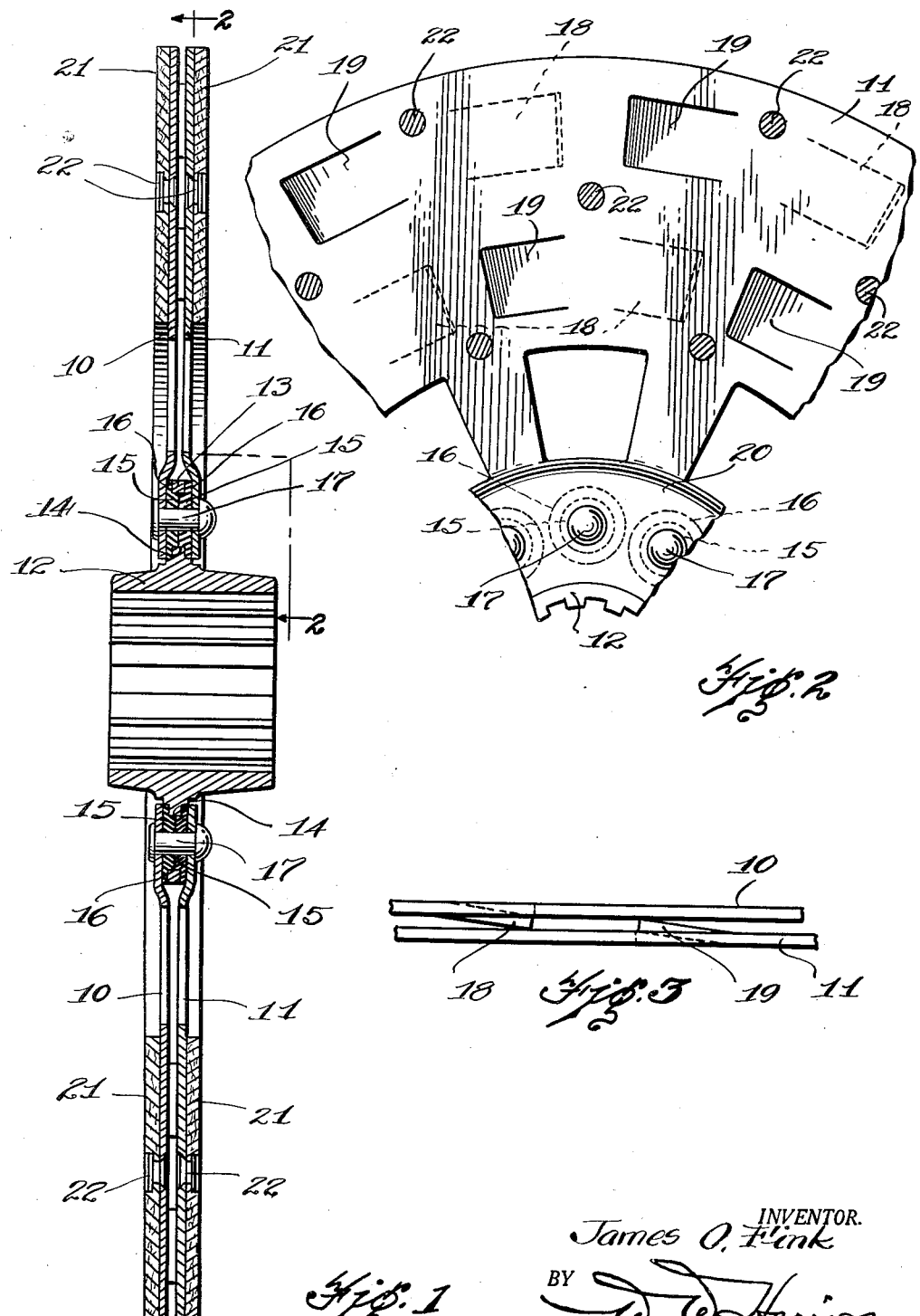
INVENTOR.
James O. Fink
BY
ATTORNEY.

Patented May 1, 1934

1,956,828

UNITED STATES PATENT OFFICE 1,956,828

CLUTCH DISK

James O. Fink, Detroit, Mich., assignor to Continental Motors Corporation, Detroit, Mich., a Corporation of Virginia Application March 2, 1931, Serial No. 519,503

9 Claims. (Cl. 192—107)

My invention relates to clutch disks and has for its object the provision of a yielding clutch disk structure for effecting a relatively gradually easy driving engagement between the driving and driven members of a power transmitting mechanism.

Warped disks and other disks of a similar nature are subjected to excessive wear in spots which necessitates frequent adjustment of the clutching mechanism and frequent replacement of worn out clutch disks.

Another object of my invention is to construct a yieldable clutch disk structure of economical manufacture and maintenance.

A further object of my invention is to provide a clutch disk having improved operating characteristics and to insure a smooth operating clutch throughout the life of the clutch disk whose life is materially prolonged as compared to the usual warped disk, because of the fact that the same is subjected to substantially a more uniform wear.

For a more detailed understanding of my invention, reference may be had to the accompanying drawing which illustrates one form which my invention may assume, and in which:

Figure 1 is a longitudinal sectional view through a clutch disk constructed in accordance with my invention, Figure 2 is a sectional view taken on the line 2—2 of Figure 1 illustrating the spring tongues for yieldingly spacing the disks and the staggered arrangement thereof, and Figure 3 is a fragmentary edge elevational view of the clutch disk structure.

The clutch disk herein illustrated is adapted for assembly with a clutch mechanism of standard design, and in view of the fact that the particular type of clutch mechanism is immaterial the same has not been illustrated as my improved disk is adapted to be clamped in driving engagement with an engine flywheel and clutch pressure plate in the usual manner. My improved clutch disk structure comprises preferably a pair of disks 10 and 11 which are adapted for coaxial assembly with an internally splined hub 12, said hub being adapted for driving connection with a driven shaft (not shown). The hub 12 is provided with an annular outwardly extending flange 13 which is provided with a plurality of openings 14, said openings being preferably concentrically arranged with respect to the axis of the hub. A pair of plugs 15 constructed of yieldable material such as rubber or the like are inserted in these openings 14 as shown in Figure 1. Preferably these yielding plugs are provided with outwardly extending flanges 16, each of which is adapted to engage the face of the annular flange 13 carried by the hub 12. The disks 10 and 11 are secured to these yielding plugs 15 by means of rivets or other fastening devices 17 and thus it will be noted that the disks are yieldingly secured to the hub 12 of the disk structure. This yielding connection between the disk structure and the hub permits a slight relative angular movement between the hub and the disks for the purpose of dampening torsional vibrations.

The disks 10 and 11 are yieldingly spaced apart and permitted to flex relative to each other in operation. This is accomplished by providing a plurality of circularly arranged groups of tongues 18 and 19 respectively struck out from the disks 10 and 11. The struck out tongues of one of the disks are adapted for engagement with the other of said disks as shown in Figure 3. Preferably these struck out tongues carried by each disk are arranged in staggered relation as shown in Figure 2 and the struck out tongues of one disk are staggered with respect to the struck out tongues of the other disk. These tongues are so positioned relative to the openings in the inner portion 20 of the disks that the disk 10 may be constructed exactly similar to the disk 11 if so desired with alternate tongues extending in opposite directions (see Fig. 3). The said disks when being assembled as shown in Figure 3 with the pressed out spring tongues of each disk extending towards the other disk will position the spring tongues relative to each other as shown in Figure 2. Friction lining 21 is secured to the outer face of each disk by means of rivets or other fastening devices 22.

In the operation of a clutch mechanism provided with a clutch disk or driven element such as illustrated in the accompanying drawing, the disks 10 and 11 are flexed toward each other closing the small gap between them under pressure against the resistance of the spring tongues 18 and 19. When these spring tongues have been completely collapsed the disks 10 and 11 are brought into contact with each other and the full drive may be transmitted from the driving elements of the clutch mechanism and are subjected to substantially uniform wear over the entire outer surface of said linings. It will be noted that lining 21 on disks 10 and 11 is not subjected to spot wear since the lining presents friction surfaces for initial and working engagement, which surfaces lie substantially in planes perpendicular with the axis of hub 12. An advantage of this construction is that the friction linings will be subjected to substantially a uniform wear, thereby materially prolonging the life of the clutch disk structure as compared to the disk structures which are engaged initially with the driving elements of the clutching mechanism in spots. It may be further noted that as a result of the uniform wear of the friction linings a materially improved operation may be obtained without frequent adjustment of the clutching mechanism or the frequent replacement of worn clutch disks.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A clutch disk structure including a pair of spaced disks each having spring tongues struck out therefrom for engagement with and in the direction of the other disk, alternate tongues extending in opposite directions, and friction linings secured to the outer faces of said disks.

2. A clutch disk structure including a pair of spring disks, spring tongues struck out inwardly from each of said disks and arranged in staggered relation with each other, the tongues carried by one disk extending oppositely to the tongues, carried by the other disk and adapted for yielding engagement with said other disk for yieldingly spacing said disks, and friction lining secured to the outer faces of said disks.

3. A clutch disk structure including a pair of clutch disks, each having a plurality of substantially circularly arranged groups of substantially circumferentially extending tongues struck out therefrom in the direction of said other disk into engagement therewith.

4. A clutch disk structure including a pair of clutch disks, each having a plurality of substantially circularly arranged groups of tongues struck out therefrom for engagement with the other disk, the tongues of a group carried by one of said disks extending in an opposite direction to the tongues of a group carried by the other of said disks.

5. A clutch disk structure including a pair of clutch disks, each having a plurality of substantially circularly arranged groups of tongues struck out therefrom for engagement with the other disk, the tongues of said groups of one of said disks extending in a direction opposite to the tongues of said groups of the other of said disks.

6. A clutch disk structure including a pair of clutch disks, each having yielding portions deflected therefrom and extending circumferentially into engagement with the other disk, said disks being similarly fashioned with the yielding portions of one of said disks staggered with respect to the yielding portions of said other disk and engaging the other disk intermediate the yielding portions thereof.

7. A clutch disk structure adapted for engagement with clutch driving elements, and including a pair of spaced clutch disks having clutch facings, each having a plurality of substantially circularly arranged substantially circumferentially extending tongues struck out therefrom for engagement with the other disk to yieldingly space said disks, whereby to provide substantially a full face contact with said clutch driving elements substantially throughout the range of the clutching action.

8. A clutch disk structure adapted for engagement with clutch driving elements, and including a pair of spaced clutch disks having clutch facings, each having a plurality of substantially circularly arranged circumferentially extending tongues struck out therefrom for engagement with the other disks to yieldingly space said disks, whereby to provide substantially a full face contact with said clutch driving elements substantially throughout the range of the clutching action, the tongues of one disk being staggered with respect to the tongues of the other disk.

9. A clutch disk structure including a plurality of spaced disks, each of said disks having spaced substantially circumferentially extending tongues struck out therefrom for engagement with the other disk, the tongues of one disk alternating with the tongues of the other disk, and friction lining secured to the outer faces of said disks.

JAMES O. FINK.